UNITED STATES PATENT OFFICE.

FRIEDRICH KOHLHAAS, OF DUSSELDORF, GERMANY.

UNMAGNETIZABLE STEEL.

981,575.

Specification of Letters Patent.   Patented Jan. 10, 1911.

No Drawing.   Application filed November 14, 1910. Serial No. 591,971.

*To all whom it may concern:*

Be it known that I, FRIEDRICH KOHLHAAS, a subject of the Emperor of Germany, residing at 38 Cranachstrasse, Dusseldorf, in the Empire of Germany, have invented certain new and useful Improvements Relating to Unmagnetizable Steel, of which the following is a specification.

Steel having a content of from 10% on of manganese enjoys but a very small degree of magnetic permeability, it takes on magnetism only with extraordinary difficulty and only in extraordinarily small quantities, being practically unmagnetizable. The high content of manganese, however, makes this steel so hard as to prevent its being worked. Besides this, the high content of manganese conduces to the limit of elasticity being situated pretty near the breaking point, so that the toughness is of too low a nature.

Unmagnetizable steel, having a high percentage of manganese, which, at the same time, is better able to be worked, while possessing a greater degree of toughness, has been successfully produced by adding to the steel an admixture of titanium. The product obtained by this means allows of being treated comparatively well; its qualities of density are, further, favorable, inasmuch as the limit of elasticity, in spite of much higher tensibility, constitutes about 47% of its breaking strength. So this new material is very tough. In spite of this, the magnetic permeability, that is, the possibility of assimilating magnetism or of being magnetizable is not so great as is the case with regard to pure nickel and cobalt. These favorable conditions allow of a more extended utilization of the steel for the various purposes for which unmagnetized or unmagnetic material has to be used, such as, *e. g.*, in ship-building, for electric measuring instruments, for the armament of electric cables, and so on.

The new steel contains, in the main, the following constitutents approximately: 9.8–10.3% manganese, 0.9–1% carbon, 0.2–1.4% titanium, maximum 0.8% silicon, maximum 0.03% sulfur, maximum 0.015% phosphorus.

The steel can be produced both in crucible-furnaces and in oxidizing martin furnaces, whereby, ordinarily soft low-carbon ingot-iron and from 80% to 85% ferro-manganese are employed.

I claim:

Unmagnetizable steel containing: about 9.8–10.3% manganese, about 0.9–1% carbon, about 0.2–1.4% titanium, maximum 0.8% silicon, maximum 0.03% sulfur and maximum 0.015% phosphorus.

In testimony whereof I affix my signature in presence of two witnesses.

FRIEDRICH KOHLHAAS. [L. S.]

Witnesses:
CHAS. J. WRIGHT,
WALTER VONNEGUT.